United States Patent
Nadachi et al.

(10) Patent No.: US 8,524,282 B2
(45) Date of Patent: Sep. 3, 2013

(54) METHOD FOR PRODUCTION OF HIGHLY PURE PHOSPHOLIPID, AND HIGHLY PURE SPHINGOMYELIN AND PLASMALOGEN-TYPE GLYCEROPHOSPHOLIPID PRODUCED BY THE METHOD

(75) Inventors: Yoshitaka Nadachi, Tokyo (JP); Siro Mawatari, Fukuoka (JP)

(73) Assignees: Umeda Jimusho Ltd., Tokyo (JP); Marudai Food Co., Ltd., Osaka (JP); Boocs Medical Corporation, Fukuoka (JP)

(*) Notice: Subject to any disclaimer, the term of this patent is extended or adjusted under 35 U.S.C. 154(b) by 67 days.

(21) Appl. No.: 12/999,801

(22) PCT Filed: Jun. 19, 2009

(86) PCT No.: PCT/JP2009/061666
§ 371 (c)(1),
(2), (4) Date: Mar. 10, 2011

(87) PCT Pub. No.: WO2009/154309
PCT Pub. Date: Dec. 23, 2009

(65) Prior Publication Data
US 2011/0160471 A1  Jun. 30, 2011

(30) Foreign Application Priority Data

Jun. 20, 2008  (JP) ................. 2008-162119

(51) Int. Cl.
*A61K 35/12* (2006.01)
*C07C 231/00* (2006.01)
*A23J 7/00* (2006.01)
*C12P 7/64* (2006.01)

(52) U.S. Cl.
USPC ............ 424/522; 424/520; 435/134; 554/41; 554/80

(58) Field of Classification Search
None
See application file for complete search history.

(56) References Cited

U.S. PATENT DOCUMENTS

| 2008/0051369 A1 | 2/2008 | Uemura et al. |
| 2009/0148877 A1 | 6/2009 | Jiang et al. |
| 2010/0029966 A1 | 2/2010 | Fujino et al. |

FOREIGN PATENT DOCUMENTS

| JP | 04-039398 A | 2/1992 |
| JP | 6228171 A | 8/1994 |
| JP | 2008-179588 A | 8/2008 |
| KR | 10-0225669 B1 | 10/1999 |
| WO | 2006/057166 A1 | 6/2006 |
| WO | 2007/078806 A2 | 7/2007 |
| WO | 2008/146942 A1 | 12/2008 |

OTHER PUBLICATIONS

Fogerty, A. C., et al., "The composition of the fatty acids and aldehydes of the ethanolamine and choline phospholipids of various meats", Int. J. Food Sci. Technol., vol. 26, No. 4, pp. 363-371, 1991.
Aggerbeck, L. P., et al., "Enzymatic probes of lipoprotein structure", The Journal of Biological Chemistry, vol. 251, No. 12, pp. 3823-3830, 1976.
Nakanishi, T., "Shokuniku no Rin Shishitsu ni Kansuru Kenkyu (Studies on Phospholipids of Meats)", Nicchiku Kaiho, vol. 37, No. 1, pp. 7-14, 1966.
Yunoki, K., et al., "Separation and determination of functional complex lipids from chicken skin", J. Am. Oil Chem. Soc., vol. 85, pp. 427-433, 2008.
"Oya Dori Miriyo Bui kara no Sphingomyelin to Plasmalogen no Bunri to Bunseki", Japan Oil Chemists' Society Dai 47 Kai Nenkai Koen Yoshishu, 17, p. 232 Sep. 17, 2008.
Maeba, R. et al., "Ethanolamine plasmalogens prevent the oxidation of cholesterol by reducing the oxidizability of cholesterol in phospholipid bilayers", Journal of Lipid Research, vol. 44, pp. 164-171, 2003.
Farooqui, A. A., et al., "Plasmalogens, Phospholipase A2, and Docosahexaenoic Acid Turnover in Brain Tissue", Journal of Molecular Neuroscience, vol. 16, pp. 263-284, 2001; discussion p. 279-284 (2001).
European Search Report dated Aug. 19, 2011, as received European Patent Application No. 09766757.0.

*Primary Examiner* — Chris R Tate
*Assistant Examiner* — Russell Fiebig
(74) *Attorney, Agent, or Firm* — Sughrue Mion, PLLC

(57) ABSTRACT

This invention provides a process for producing a high-purity sphingomyelin and a high-purity plasmalogen-form glycerophospholipid from a biological material by simple procedures at high yields. The process comprises the steps of: (A) subjecting dried total lipids extracted from a biological material to extraction treatment with a specific mixture solution to separate an insoluble portion composed mainly of sphingomyelin and a soluble portion; (B) subjecting the insoluble portion, obtained in said Step (A), to washing treatment with a specific mixture solution to obtain crude sphingomyelin; (C) subjecting the soluble portion, obtained in said Step (A), to washing treatment with a water-soluble ketone solvent to obtain crude plasmalogen-form glycerophospholipid; (D) causing an enzyme to act on the crude sphingomyelin, obtained in said Step (B), to obtain sphingomyelin having a purity of 90% or more; and (E) causing an enzyme to act on the crude plasmalogen-form glycerophospholipid, obtained in said Step (C), to obtain plasmalogen-form glycerophospholipid having a purity of 40% or more.

5 Claims, 8 Drawing Sheets

METHOD FOR PRODUCTION OF HIGHLY PURE PHOSPHOLIPID, AND HIGHLY PURE SPHINGOMYELIN AND PLASMALOGEN-TYPE GLYCEROPHOSPHOLIPID PRODUCED BY THE METHOD

This application is a National Stage of International Application No. PCT/JP2009/061666 filed Jun. 19, 2009, claiming priority based on Japanese Patent Application No. 2008-162119 filed Jun. 20, 2008, the contents of all of which are incorporated herein by reference in their entirety.

TECHNICAL FIELD

The present invention relates to a process for producing a high-purity sphingomyelin, in particular, a human sphingomyelin, and a high-purity plasmalogen-form glycerophospholipid, which are useful as materials of functional foods, medicinal products, cosmetics etc., from a biological material, preferably from poultry, by simple procedures at high yields. The present invention also relates to a high-purity sphingomyelin and a high-purity plasmalogen-form glycerophospholipid obtained by the process.

BACKGROUND ART

Lipids refer to substances that have a long-chain fatty acid or similar hydrocarbon chain in a molecule, and that are present in an organ or derived from a zoic organ. Lipids can be classified into simple lipids and complex lipids. Simple lipids are composed of C, H and O, and are generally soluble in acetone; the simple lipid triacylglycerol is present as an energy reservoir in a fat tissue of an animal body. On the other hand, complex lipids are a group of lipids containing P of phosphoric acid, N of a base etc. Therefore, complex lipids are composed of a hydrophobic part (fatty acid part) and a hydrophilic part (phosphoric acid and base parts), and exhibit an amphophilic nature. Generally, the above simple lipids are soluble in acetone, while the complex lipids are insoluble in acetone. Such complex lipids are a constituent of biomembranes.

The above complex lipids can be classified into (1) glycerophospholipids (such as phosphatidylcholine (also known as lecithin), phosphatidylethanolamine, etc.), (2) sphingophospholipids (such as sphingomyelin, ceramide ciliatine, etc.), (3) sphingoglycolipids (such as cerebroside, sulfatide, ganglioside, etc.) and (4) glyceroglycolipids (such as lipids in which various saccharides bond to diacyl glycerol existing in microorganisms or higher plants). The above (2) sphingophospholipids and (3) sphingoglycolipids are generically referred to as "sphingolipids".

The above glycerophospholipid is a generic term for lipids having glycerophosphoric acid backbone in their structure, and includes phosphatidylcholine (lecithin), phosphatidylethanolamine, diphosphatidylglycerol, etc. Many lipids belonging to this glycerophospholipid are those in which the non-polar portion is a fatty acid ester, while some are of a plasmalogen form having a vinyl ether bond.

The above glycerophospholid is important as a constituent of biomembranes; above all, the plasmalogen-form glycerophospholipid has high radical sensitivity due to its vinyl-ether bond, and, hence, in recent years has been highlighted as a phospholipid having anti-oxidation nature. It has recently been reported that the plasmalogen-form glycerophospholipid contributes to oxidation-stability of phospholipid membrane containing cholesterol through a mechanism different from α-tocopherol (vitamin E) that is an anti-oxidation constituent of cell membrane (for example, see Non-patent Literature 1). Further, it is also highlighted that the plasmalogen-form glycerophospholipid not only takes part in the oxidation resistance of cell membrane and lipoprotein, but also has an important role in the information communication system of cells (for example, see Non-patent Literature 2).

The above plasmalogen-form glycerophospholipid is expected to have the function of preventing the death of brain nerve cells in dementia. Under the circumstances, however, no supply source that is safe and makes a large amount available has been found.

On the other hand, sphingolipid is a generic term for lipids having a long-chain base such as sphingosine, and it is composed mainly of sphingoglycolipid and sphlngophospholipid as described above. The sphingoglycolipid contains a long-chain base such as sphingosine, phytosphingosine etc. in addition to saccharide and long-chain fatty acid. The simplest sphingoglycolipid is cerebroside; apart from cerebroside, sphingoglycolipid includes sulfatide in which a sulfuric acid group is bonded thereto, ceramide oligohexoside in which several molecules of neutral saccharide are bonded thereto, ganglioside in which sialic acid is bonded thereto, etc. These lipids are present in the cell cortex, and are thought to take part in a recognitive mechanism.

Sphingophospholipids are classified into derivatives of ceramide 1-phosphoric acid and derivatives of ceramide 1-phosphonic acid. Sphingomyelin is a well-known example of the former, while ceramide ciliatine (ceramide aminoethylphosphonic acid) is a well-known example of the latter.

These sphingolipids are highlighted since it has been shown in recent years that ceramide, sphingosine, sphingosine-1-phosphoric acid, etc., which are decomposition metabolites thereof, take part in the information communication in cells. Further, sphingolipids take part in the formation of a membrane microdomain called a "raft" together with cholesterol, etc., and it has been shown that this microdomain plays an important role as a site of information communication; accordingly, further increased attention has been paid to sphingolipids.

These sphingolipids have hitherto been extracted from cow brains and utilized; however, those that are derived from cereals or fungi are now used from a safety standpoint. Since, however, sphingoid bases constituting sphingolipids derived from cereals or fungi differ from those of mammals, there is a problem that their utility in organisms is low compared with human-form sphingolipids.

Meanwhile, when a relatively large amount of sphingomyelin is produced from total lipids of foods or animal tissues, it is produced by eluting it stepwise by means of column chromatography using silicic acid, etc., or by fractionating it stepwise according to a solvent fractionation method. Both of these require complicated procedures. In the solvent fractionation method, it is a general practice to employ a method in which acetone is added to total lipids to precipitate complex lipid (phospholipid) (insoluble portion), after which the insoluble portion is washed with ether to remove glycerophospholipid, and the residue is taken as a crude sphingolipid fraction. This fraction contains not only sphingomyelin, but also glycerosphingolipids such as cerebroside.

On the other hand, it is known that the phospholipid of chicken skin contains a great deal of human-form sphingomyelin and plasmalogen-form glycerophospholipid.

CITATION LIST

Non-Patent Literature

NPL 1: Literature 1 "J. Lipid Res.", Volume 44, P 164-171 (2003)
NPL 2: "J. Mol. Neurosci.", Volume 16, P 263-272; discussion P 279-284 (2001)

SUMMARY OF INVENTION

Technical Problem

Under such circumstances, an object of the present invention is to provide a process for producing high-purity sphingomyelin, in particular, a human sphingomyelin, and high-purity plasmalogen-form glycerophospholipid from a biological material by simple procedures at high yields.

Solution to Problem

The present inventors conducted intensive studies to achieve the foregoing object, and found that the above object can be achieved by processing a biological material in a specific manner. Based on this finding, the inventors completed the present invention.

Specifically, this invention provides:

[Item 1] A process for producing high-purity phospholipid, comprising the steps of:
(A) subjecting dried total lipids extracted from a biological material to extraction treatment with a mixture solution of an aliphatic hydrocarbon solvent and a water-soluble ketone solvent to separate an insoluble portion composed mainly of sphingomyelin and a soluble portion;
(B) subjecting the insoluble portion composed mainly of sphingomyelin, obtained in said Step (A), to washing treatment with a mixture solution of an aliphatic hydrocarbon solvent and a water-soluble ketone solvent to obtain crude sphingomyelin;
(C) subjecting the soluble portion, obtained in said Step (A), to solvent-removing treatment and subsequently to washing treatment with a water-soluble ketone solvent to obtain crude plasmalogen-form glycerophospholipid;
(D) causing phospholipase, which is glycerophospholipid hydrolase, to act on the crude sphingomyelin, obtained in said Step (B), to hydrolyze a glycerophospholipid group contained in the crude sphingomyelin, and performing solvent partition to obtain sphingomyelin having a purity of 90% or more; and
(E) causing phospholipase, which is glycerophospholipid hydrolase, to act on the crude plasmalogen-form glycerophospholipid, obtained in said Step (C), to hydrolyze other glycerophospholipid groups contained in the crude plasmalogen-form glycerophospholipid, and performing solvent partition to obtain plasmalogen-form glycerophospholipid having a purity of 40% or more.

[Item 2]
The process according to Item 1, wherein the biological material is poultry.

[Item 3]
The process according to Item 2, wherein the poultry is a culled laying hen and/or a culled breeding hen.

[Item 4]
The process according to Item 3, wherein the culled laying hen is obtained from a forced-molted laying hen.

[Item 5]
The process according to any one of Items 1 to 4, wherein the aliphatic hydrocarbon solvent is n-hexane.

[Item 6]
The process according to any one of Items 1 to 5, wherein the water-soluble ketone solvent is acetone.

[Item 7]
A high-purity sphingomyelin obtained by the process according to any one of Items 1 to 6, wherein the high-purity sphingomyelin has a purity of 90% or more.

[Item 8]
A high-purity plasmalogen-form glycerophospholipid obtained by the process according to any one of Items 1 to 6, wherein the plasmalogen-form glycerophospholipid has a purity of 40% or more.

[Item 9]
The plasmalogen-form glycerophospholipid according to Item 8, wherein the plasmalogen-form glycerophospholipid is a plasmalogen-form phosphatidylcholine having a purity of 90% or more.

[Item 10]
The plasmalogen-form glycerophospholipid according to Item 8, wherein the plasmalogen-form glycerophospholipid is a plasmalogen-form phosphatidylethanolamine having a purity of 90% or more.

Advantageous Effects of Invention

The present invention provides a process for producing high-purity sphingomyelin, in particular, human sphingomyelin, and high-purity plasmalogen-form glycerophospholipid, which are useful as materials of functional foods, medicinal products, cosmetics etc., from a biological material, preferably from poultry, by simple procedures at high yields; and also provides a high-purity sphingomyelin and a high-purity plasmalogen-form glycerophospholipid obtained by the process.

BRIEF DESCRIPTION OF DRAWINGS

[FIG. 1-2]
A flow chart showing the processes of extracting total lipids from chicken breast meat in an Example.

[FIG. 2]
A flow chart showing the processes of extracting crude plasmalogen and crude sphingomyelin from chicken skin total lipids in an Example.

Figure 1:
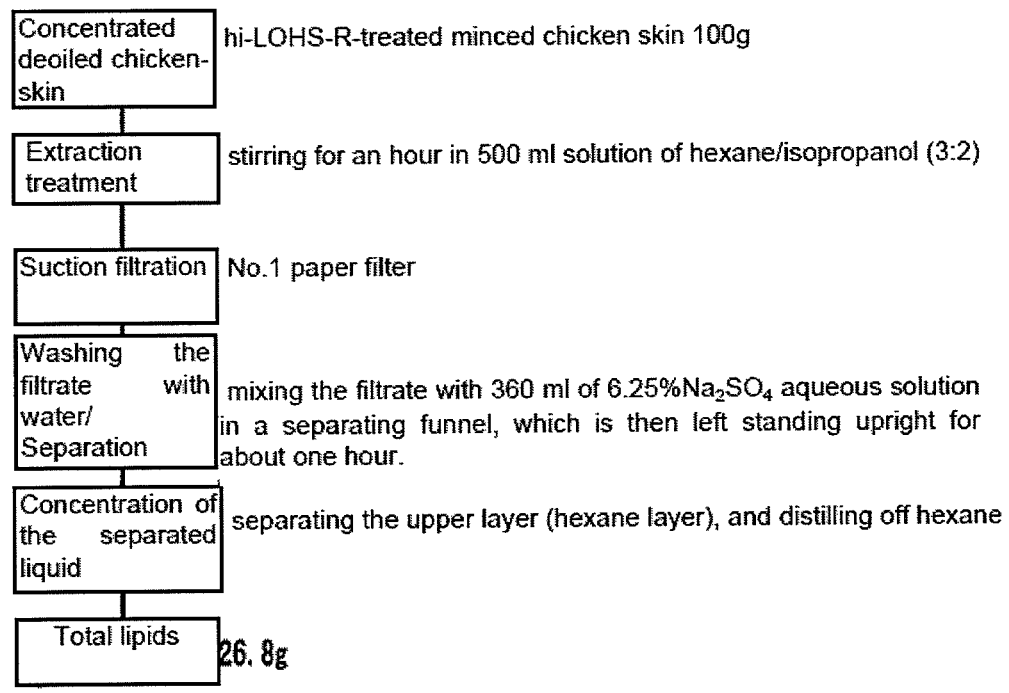
[FIG. 1-1]
A flow chart showing the processes of extracting total lipids from chicken skin in an Example.

An explanatory view showing a process for obtaining high-purity plasmalogen and a process for separating the same in an Example.

DESCRIPTION OF EMBODIMENTS

The process for producing high-purity phospholipid according to the present invention comprises Step (A), Step (B), Step (C), Step (D) and Step (E).

Step (A)

This Step (A) is a step in which the dried total lipids extracted from a biological material are subjected to extraction treatment with a mixture solution of an aliphatic hydrocarbon solvent and a water-soluble ketone solvent to separate an insoluble portion composed mainly of sphingomyelin and a soluble portion.

The biological material used as a raw material in Step (A) is not particularly limited, and various biological materials may be used as long as they contain a sphingomyelin, in particular, a human sphingomyelin, and a plasmalogen-form glycerophospholipid. Among various biological materials, poultry is preferable in terms of its availability, content of target substance, and economical efficiency; further, culled laying hens and culled breeding hens of broilers (male/female) are more preferable. Examples of regions include bowel, neck, wing, leg, head, bone, etc., as well as epidermis and breast.

The aforementioned culled laying hens refer to laying hens subjected to culling. Culling is performed, for example, by fasting white strain laying hens (Julia) or brown strain laying hens (Boris Brown, Sonia) for several days at an average age of 550 days old.

Among the culled laying hens, those subjected to forced molting are particularly preferred for the following reasons.

Forced molting is performed by fasting laying hens of about 500 and several days old, which have decreased laying efficiency, for 10 to 14 days, and then compulsorily de-feathering the hens. This process reproduces the functions of the laying hen, thereby prolonging the laying period by about another 200 days. These forced-molted laying hens are culled in the same way as above.

In some cases, these forced-molted laying hens are subjected to another forced molting at about 700 days old, thereby further extending the laying period by up to 900 days (this period is referred to as double forced molting). An appropriate time of culling of the laying hens is at 500 to 950 days old, more preferably 550 to 900 days old, further preferably 600 to 750 days old.

The laying hens, in particular, those of 500 days old or older, are under greater stress than the other hens. Therefore, as evident from the described function reproduction shown by the increase in laying efficiency, the secretions of various function-expressing components, such as minor components including hormones, vitamins and cytokines, whose contents are decreased in aged hens, increase, thereby preventing the decrease of the contents by aging.

On the other hand, broiler breeding hens (male/female Chunky and Cobb) are culled at an average age of 450 days old. Broilers are generally raised in good condition; robustness is most important in raising male broilers, while good health is most important for female broilers, as they are required to efficiently produce healthy fertilized ovum. Hence, in culled broilers, the contents of function-expressing components are smaller than those in their peak period. An appropriate time for the culling of broilers is at 300 to 550 days old, more preferably 370 to 550 days old, further preferably 400 to 450 days old.

In Step (A), total lipids are extracted from a biological material, for example, from epidermis or breast meat of a culled laying hen or culled breeding hen. The extracted total lipids are then dried.

When using chicken skin, it is preferable to use minced or powdered chicken skin. For example, as required, chicken skin may be defatted to remove the fat content to some extent before being minced or powdered. For the defatting treatment of chicken skin, there may be employed a mechanical method, a method of immersion in hot water under heat, a direct heating method, a method using an aliphatic hydrocarbon solvent (n-hexane), or the like. When using breast meat, it is preferable to use minced breast meat.

Then, total lipids are extracted from the thus-obtained minced or powdered chicken skin or minced chicken breast meat using a solvent, and are dried to obtain dried total lipids. As the solvent, various solvents may be used; however, it is preferable to use a mixture solution of n-hexane and isopropanol. The mixture solution preferably contains n-hexane and isopropanol at a capacity ratio of 8:2 to 4:6, more preferably 7:3 to 5:5.

The extraction may be performed by a usual method. The solvent is distilled off from the resulting extract by a conventional method using a rotary evaporator or the like, or by introducing nitrogen gas, thereby obtaining dried total lipids.

The dried total lipids obtained in the above manner are subjected to extraction treatment with a mixture solution of an aliphatic hydrocarbon solvent and a water-soluble ketone solvent to separate an insoluble portion composed mainly of sphingomyelin (it is also referred to as a "crude sphingomyelin" hereinafter) and a soluble portion.

Examples of the aliphatic hydrocarbon solvent as one component in the mixture solution that is used for the extraction treatment of the dried total lipids in Step (A) include n-pentane, isopentane, n-hexane, isohexane, n-heptane, isoheptane, cyclopentane and/or cyclohexane. They may be used singly, or in a combination of two or more. Among them, n-hexane is suitable.

Examples of the water-soluble ketone solvent, that is, the other component of the above mixture solution, include acetone and methyl ethyl ketone. Among them, acetone is suitable.

When a mixture of n-hexane and acetone is used as the mixture solution, the capacity ratio thereof is preferably 4:6 to 6:4, more preferably 4.5:5.5 to 5.5:4.5.

Further, the amount of the mixture solution for use is normally approximately 10 to 30 ml per gram of the dried total lipids. When the amount of the mixture solution is less than 10 mL, the extraction treatment cannot be sufficiently carried out, and the purity and yield of sphingomyelin in the insoluble portion may decrease. When the amount exceeds 30 mL, further effects on improvements of the purity and yield of sphingomyelin in proportion to that amount may not be produced. The amount of the mixture solution for use is preferably 15 to 25 mL per gram of the dried total lipids. The extraction treatment can be carried out according to a usual method.

The liquid obtained after extraction treatment can be separated by centrifugal treatment into a soluble portion and an insoluble portion composed mainly of sphingomyelin.

Step (B)

In Step (B), the insoluble portion composed mainly of sphingomyelin obtained in Step (A) is washed with a mixture solution of an aliphatic hydrocarbon solvent and a water-soluble ketone solvent, thereby obtaining crude sphingomyelin.

The aliphatic hydrocarbon solvent and the water-soluble ketone solvent used as components of a mixture solution for the washing process in Step (B) are the same as those described in Step (A).

When a mixture of n-hexane and acetone is used as a mixture solution, the capacity ratio thereof is preferably 4:6 to 6:4, more preferably 4.5:5.5 to 5.5:4.5.

The crude sphingomyelin is thus obtained.

Step (C)

Step (C) is a step in which the insoluble portion obtained in the above Step (A) is subjected to solvent-removing treatment, followed by washing with a water-soluble ketone solvent, thereby obtaining a crude plasmalogen-form glycerophospholipid.

Examples of the water-soluble ketone solvent used in Step (C) include acetone and/or methyl ethyl ketone. Among them, acetone is suitable.

In Step (C), the solvent in the soluble portion obtained in Step (A) is first distilled off, and the residue is washed with a water-soluble ketone solvent, thereby obtaining a crude plasmalogen-form glycerophospholipid.

Step (D)

Step (D) is a step in which a glycerophospholipid hydrolase phospholipase is caused to act on the crude sphingomyelin obtained in Step (B) so as to hydrolyze the glycerophospholipid group contained therein, followed by solvent partition to obtain a sphingomyelin having a purity of 90% or more.

In Step (D), an enzyme phospholipase is caused to act on the crude sphingomyelin obtained in Step (B), so as to hydrolyze the glycerophospholipid group contained therein. In this enzyme reaction, the amount of enzyme phospholipase is generally about 0.15 to 0.45 g, preferably about 0.2 to 0.3 g, per gram of the crude sphingomyelin. The reaction temperature is generally about 30 to 70° C., preferably 45 to 55° C. The pH value is generally about 3.5 to 5.5, preferably 4 to 5. For the reaction time, 1 to 5 hours of reaction should be sufficient.

After performing the enzyme reaction as above, sphingomyelin is separated by solvent partition. A preferable example of the solvent used in the solvent partition is a combination of an aliphatic hydrocarbon solvent and a water-soluble ketone solvent. n-hexane is suitable for the aliphatic hydrocarbon solvent, and acetone is suitable for the water-soluble ketone solvent. When a mixture of n-hexane and acetone is used, the proportion thereof is generally preferably 4:6 to 6:4, more preferably 4.5:5.5 to 5.5:4.5 in capacity ratio.

After sphingomyelin is separated by solvent partition, followed by standing under ice-cooling for an hour, centrifugation is performed to separate the solid from the liquid. The solids content thus obtained is washed with a mixture solution of an aliphatic hydrocarbon solvent and a water-soluble ketone solvent, preferably a mixture solution of n-hexane and acetone having a capacity ratio of 4:6 to 6:4, followed by standing under ice-cooling for an hour and centrifugation to separate the solid from the liquid, thereby obtaining high-purity sphingomyelin having a purity of 90% or more, preferably 95% or more, more preferably 99% or more.

(E) Step

Step (E) is a step in which a glycerophospholipid hydrolase phospholipase is caused to act on the crude sphingomyelin obtained in Step (C) so as to hydrolyze other glycerophospholipid group contained therein, followed by solvent partition to obtain a plasmalogen-form glycerophospholipid having a purity of 40% or more.

In Step (E), an enzyme phospholipase is caused to act on the crude plasmalogen-form glycerophospholipid obtained in Step (C), so as to hydrolyze other glycerophospholipid group contained in the crude plasmalogen-form glycerophospholipid. In this enzyme reaction, the amount of enzyme phospholipase is generally about 0.15 to 0.45 g, preferably about 0.2 to 0.3 g, per gram of the crude plasmalogen-form glycerophospholipid. The reaction temperature is generally about 30 to 70° C., preferably 45 to 55° C. The pH value is generally about 3.5 to 5.5, preferably 4 to 5. For the reaction time, 1 to 5 hours of reaction should be sufficient.

After performing the enzyme reaction as above, solvent partition is performed to extract plasmalogen-form glycerophospholipid. A preferable example of the solvent used in the solvent partition process is a combination of an aliphatic hydrocarbon solvent and a lower alcohol solvent. n-hexane is suitable for the aliphatic hydrocarbon solvent, and isopropanol is suitable for the lower alcohol solvent. When a mixture of n-hexane and isopropanol is used, the proportion thereof is generally 8:2 to 4:6, preferably 7:3 to 5.5 in capacity ratio.

After the extraction by way of solvent partition, the aliphatic hydrocarbon solvent layer is washed with water, and the solids content resulting from distillation of the solvent is washed with a mixture solution of an aliphatic hydrocarbon solvent and a water-soluble ketone solvent, preferably a mixture solution of n-hexane and acetone having a capacity ratio of 4:6 to 6:4, followed by centrifugation or the like to separate the solid and the liquid, thereby obtaining high-purity plasmalogen-form glycerophospholipid having a purity of 40% or more, preferably 95% or more, more preferably 99% or more.

Further, high-purity plasmalogen-form phosphatidylcholine having a purity of 95% or more, preferably 99.5% or more; and high-purity plasmalogen-form phosphatidylethanolamine having a purity of 95% or more, preferably 99.5% or more, can also be obtained.

The process of the present invention enables, when using chicken skin as a raw material, production of about 0.2 to 0.6 mass % of a high-purity sphingomyelin generally having a purity of 90% or more, and 0.3 to 2 mass % of high-purity mixed plasmalogen-form glycerophospholipid having a purity of 40% or more, from concentrated deoiled chicken skin. The process also enables, when using chicken breast meat as a raw material, production of about 0.2 to 1 mass % of high-purity mixed plasmalogen-form glycerophospholipid having a purity of 40% or more, and 0.01 to 0.1 mass % of a high-purity sphingomyelin having a purity of 90% or more.

Sphingomyelin includes a phosphoric diester bond formed by a primary-alcoholic hydroxyl group of ceramide and choline phosphoric acid, and has a structure of the following formula (I),

[Chem. 1]

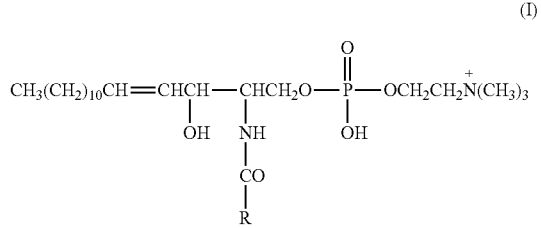

wherein R-CO represents a fatty-acid residue, and is normally widely present not only in brain tissues, but also in organ tissues of animal bodies.

Since most of the sphingoid bases constituting the sphingomyelin derived from chicken epidermides, obtained by the process of this invention, are 4-trans-sphingenin (sphingosine), this sphingomyelin is a human-form sphingomyelin having high bioavailability.

It has been reported that sphingomyelin as ceramide, sphingosin, sphingosin-1-phosphoric acid, etc., which are metabolites produced by decomposition thereof, participates in information communication in lipids; it has also been revealed that sphingomyelin participates in the formation of a membrane microdomain called a "raft" together with cholesterol etc., and that the microdomain performs an important role as an information communication site. Further, sphingomyelin is expected to have a skin moisture-retaining effect, an effect of preventing a large intestine cancer, and the like.

The high-purity plasmalogen-form glycerophospholipid obtained by the process of the present invention mainly contains phosphatidylethanolamine (PE), and partially contains phosphatidylcholine (PC). Approximately 80 mass % of the above PE is plasmalogen-form, and PC contains approximately 30 mass % of a plasmalogen-form.

The following formulae (II) and (III) show structures of a diacyl-type glycerophospholipid and a plasmalogen-form glycerophospholipid, respectively.

[Chem. 2]

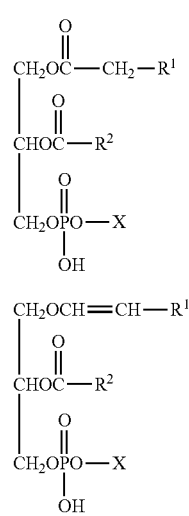

A general glycerophospholipid (lecithin) has an ester bond with an aliphatic acyl group in sn-1 (1 position) of glycerol as shown in the formula (II), while a plasmalogen-form has a vinyl ether bond having an alkenyl group in sn-1 of glycerol as shown in the formula (III).

When X is an aminoethyl group, it is a phosphatidylethanolamine; and when X is a trimethyl aminoethyl group, it is phosphatidylcholine.

The present invention causes an enzyme phospholipase to act on the crude plasmalogen-form glycerophospholipid so as to hydrolyze a general glycerophospholipid group mainly represented by the formula (II), thereby producing a high-purity sphingomyelin having a purity of 90% or more, and a high-purity plasmalogen-form glycerophospholipid having a purity of 40% or more.

The above plasmalogen-form glycerophospholipid attracts attention as an oxidation-resisting phospholipid because its vinyl ether bond has high radical sensitivity, and it is known to contribute to the oxidation stability of a phospholipid membrane containing cholesterol. Further, it has been stated that the plasmalogen-form glycerophospholipid not only takes part in the oxidation resistance of cell membrane and lipoprotein, but also plays an important role in the information communication system of cells. The above plasmalogen-form glycerophospholipid is expected to work to prevent the neurocyte death of a brain in dementia, or have an effect on the prevention of the onset of atherosclerosis.

The present invention also provides a high-purity sphingomyelin having a purity of 90% or more, and a high-purity plasmalogen-form glycerophospholipid having a purity of 40% or more, which are obtained by the above-described process of the present invention.

EXAMPLES

The present invention is more specifically explained below in reference to Examples. The present invention is, however, not limited to those examples. In the following, SM, plPC and plPE represent sphingomyelin, plasmalogen-form phosphatidylcholine, and plasmalogen-form phosphatidylethanolamine, respectively.

Example 1

Preparation of SM and plPE Derived from Culled Laying Hen Skin (1) Deoiling of Minced Chicken Skin and Extraction/Separation of Total Lipids from a Freeze-Dried Product Thereof Frozen minced chicken skin (supplied by Noji Kumiai Houjin, Enu Chicken (Chiran-cho gun 3669, Minami-kyushu shi, Kagoshima Prefecture) processed to 8 mm mince) obtained from the green skin of a culled laying hen (Julia, 550 days old) was concentrated by deoiling, followed by a usual freeze-drying process. The freeze-dried mince was subjected to total lipids extraction as shown in FIG. 1-1. The total lipids were obtained at a yield of 26.8%.

Figures 1, 2:
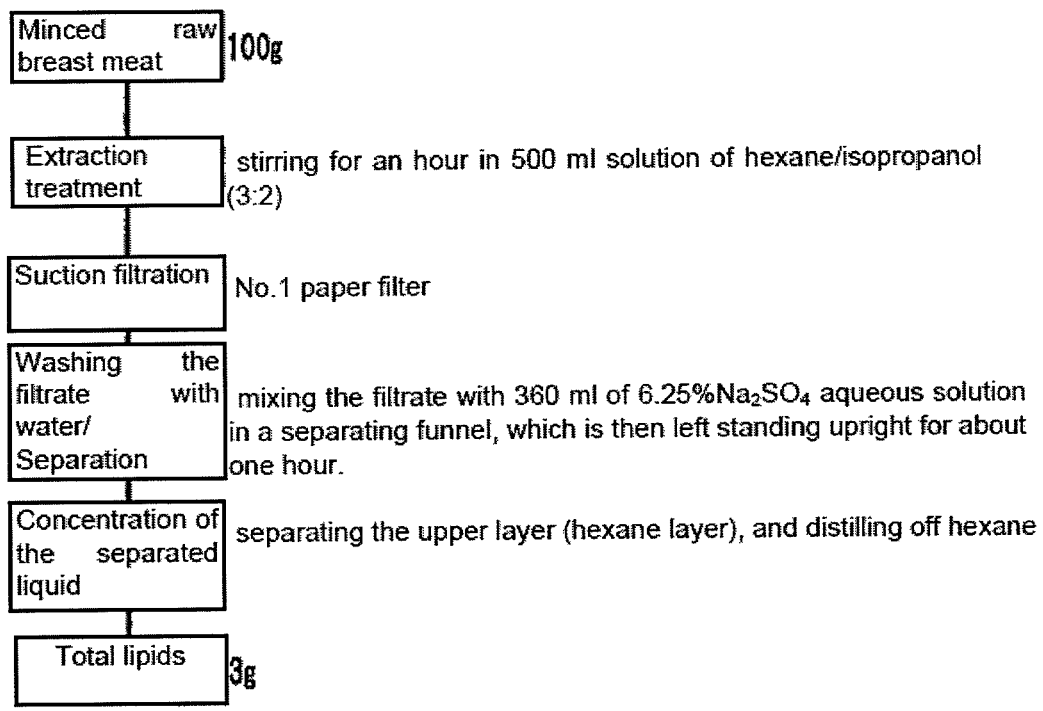
Figure 2:
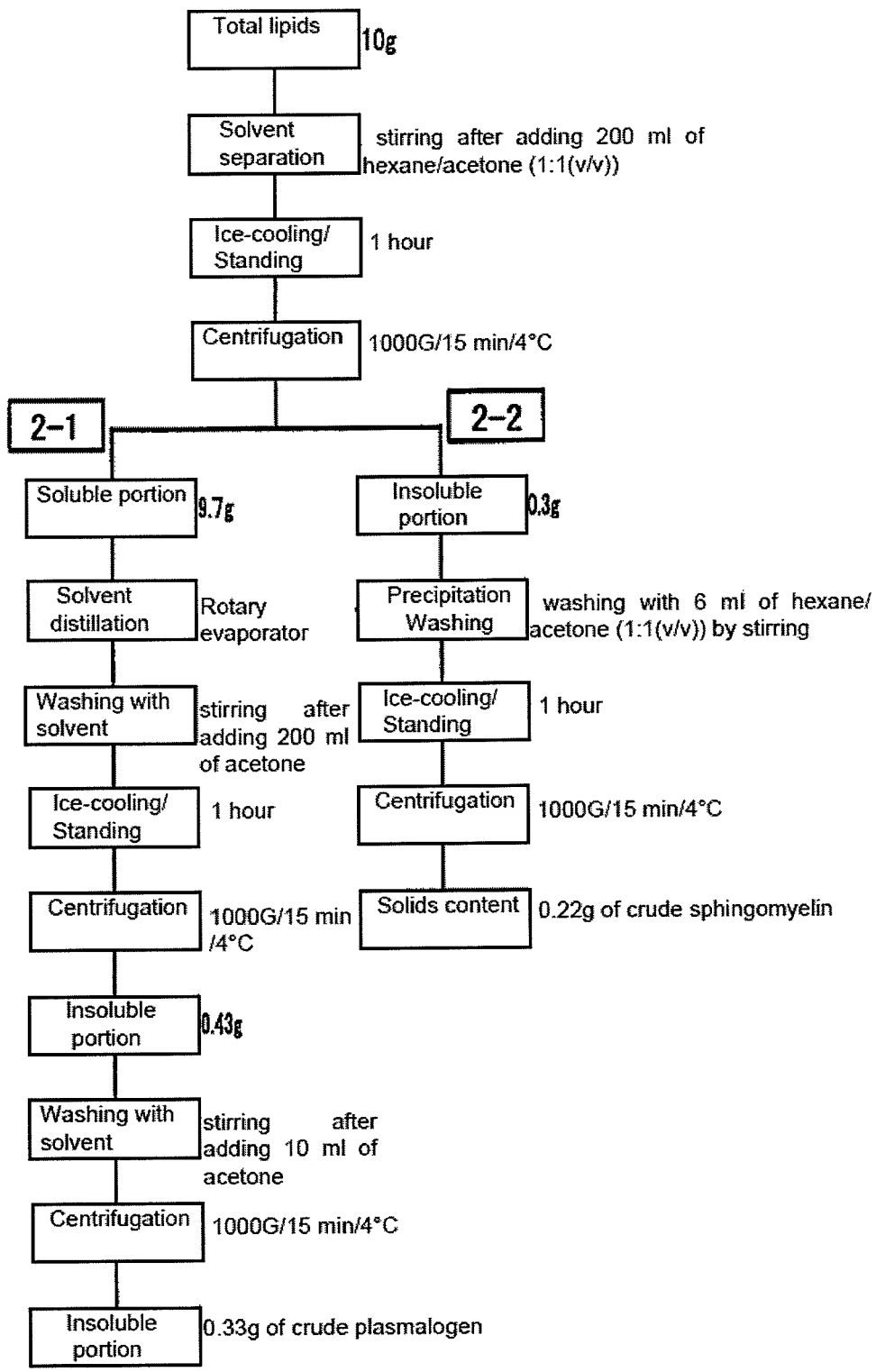
Figure 3:
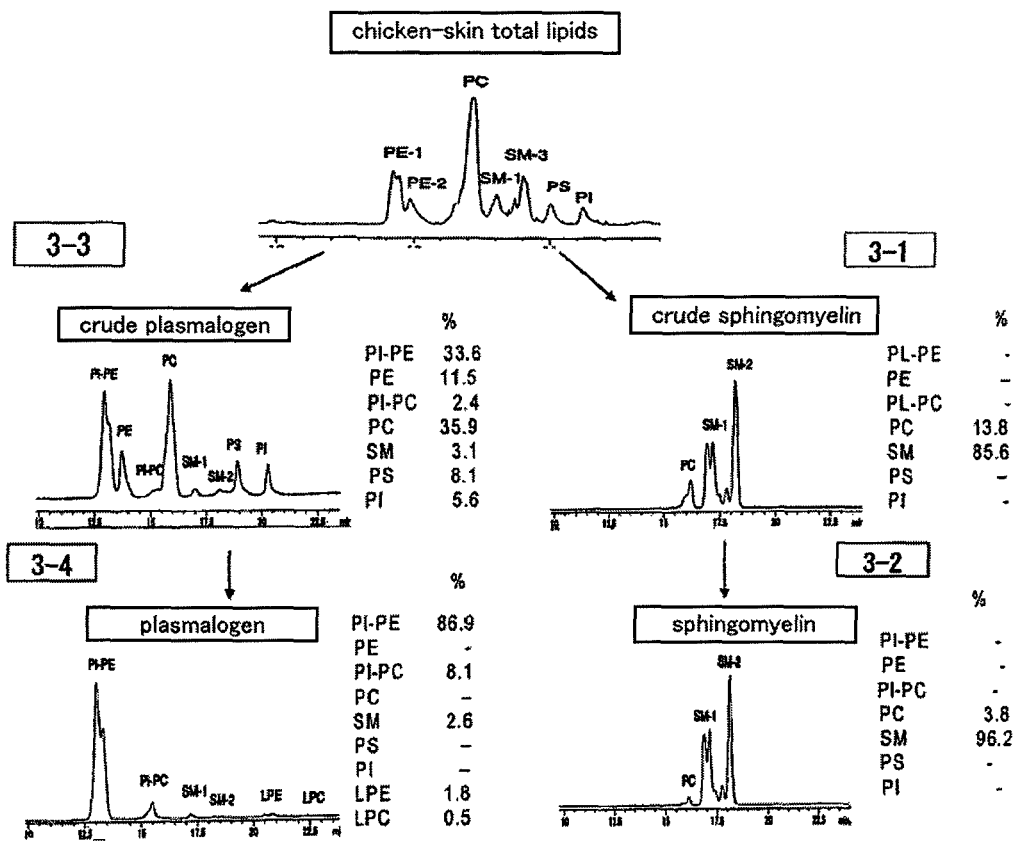
[FIG. 3]
An HPLC chart of chicken skin-derived phospholipids, according to an Example.

(2) Extraction of a Crude SM from Total Lipids Derived from Culled Laying Hen Skin 0.22 g (yield=2.2%) of a crude SM was obtained from 10 g of total lipids according to the method shown in FIG. 2-2 of FIG. 2. The crude SM was subjected to HPLC assay under the following conditions (the conditions are hereinafter referred to as the "aforementioned conditions"), resulting in a purity of 85.6% (FIG. 3-1 of FIG. 3).

1) Device: HPLC Agilent 1100 system (Agilent Technologies, Tokyo)
2) Column: Lichrosphere 100 Diol (250×4 mm, 5 μm) (Agilent Technologies,)
3) Flow rate: 0.8 ml/min
4) Detection: ELSD
5) Mobile phase
A; Hexane/isopropanol/acetic acid (82:17:1, V/V, 0.008% TEA)
B; isopropanol/distilled water/acetic acid (85:14:1, V/V, 0.008% TEA)
Table 1 shows time zone and liquid composition of mobile phases A and B.
TEA: Triethylamine

TABLE 1

| Min. | A % | B % |
|---|---|---|
| 0 | 95 | 5 |
| 23 | 60 | 40 |
| 27 | 15 | 85 |
| 28 | 15 | 85 |
| 31 | 95 | 5 |
| 36 | 95 | 5 |

(3) Extraction of Crude [plPE+plPC] from Total Lipids Derived from culled chicken skin According to the method shown in FIG. 2-1 of FIG. 2, 0.33 g of (yield=3.3%) crude [plPE+plPC] was separated from 10 g of total lipids. The crude [plPE+plPC] was subjected to HPLC assay under the aforementioned conditions, resulting in a purity of 36% (FIG. 3-3 of FIG. 3).

(4) Purification of Crude SM (Purity=85.6%) Using Enzyme

Figure 4:
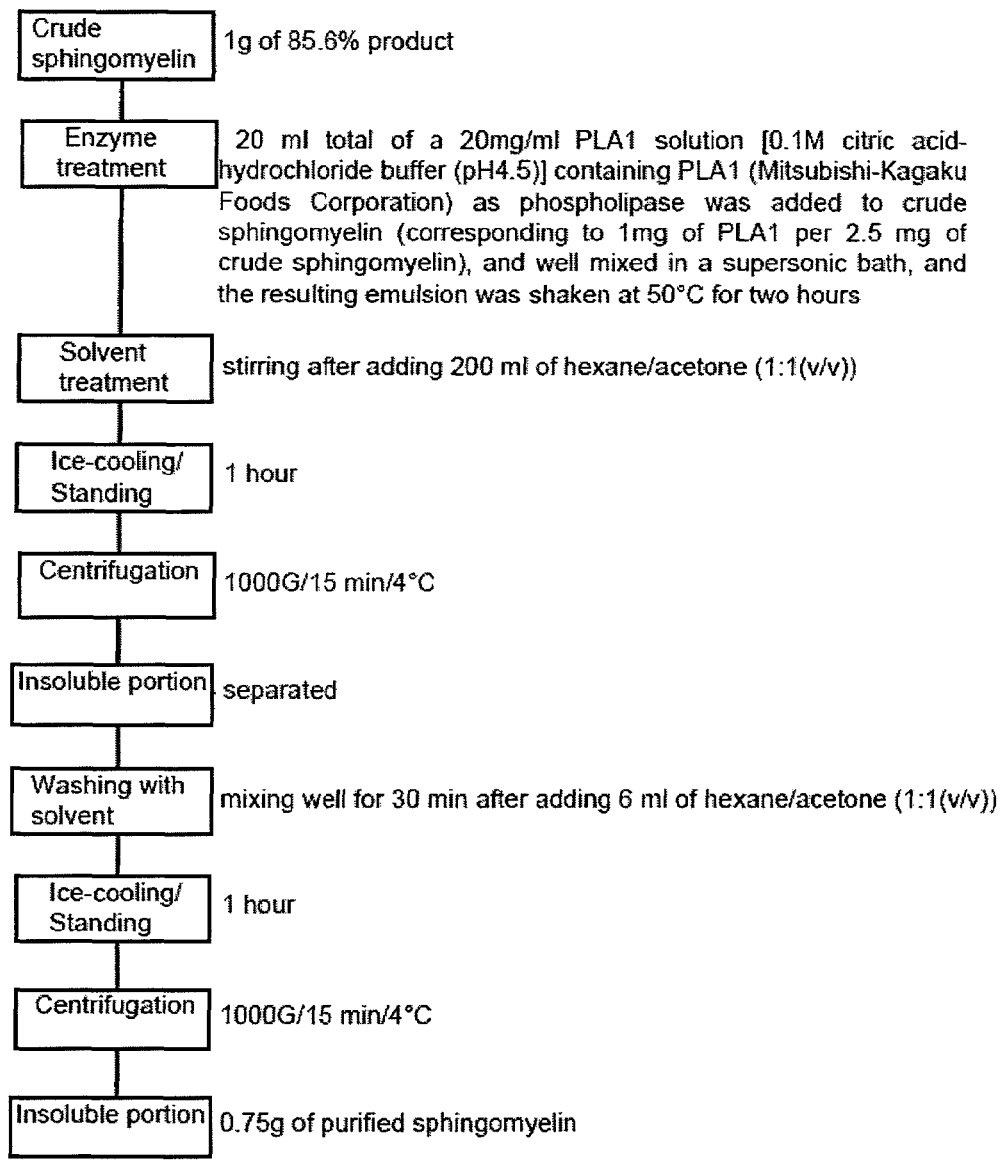
[FIG. 4]
A flow chart showing the processes of producing purified sphingomyelin from crude sphingomyelin in an Example.

According to the method shown in FIG. 4, 0.75 g (yield=75%) of purified SM was obtained from 1 g of the crude product. A purity assay under the aforementioned conditions revealed that the purity was 96.2% (FIG. 3-2 of FIG. 3).

(5) Purification of Crude [plPE+plPC] (Purity=36%) Using Enzyme

Figure 6:
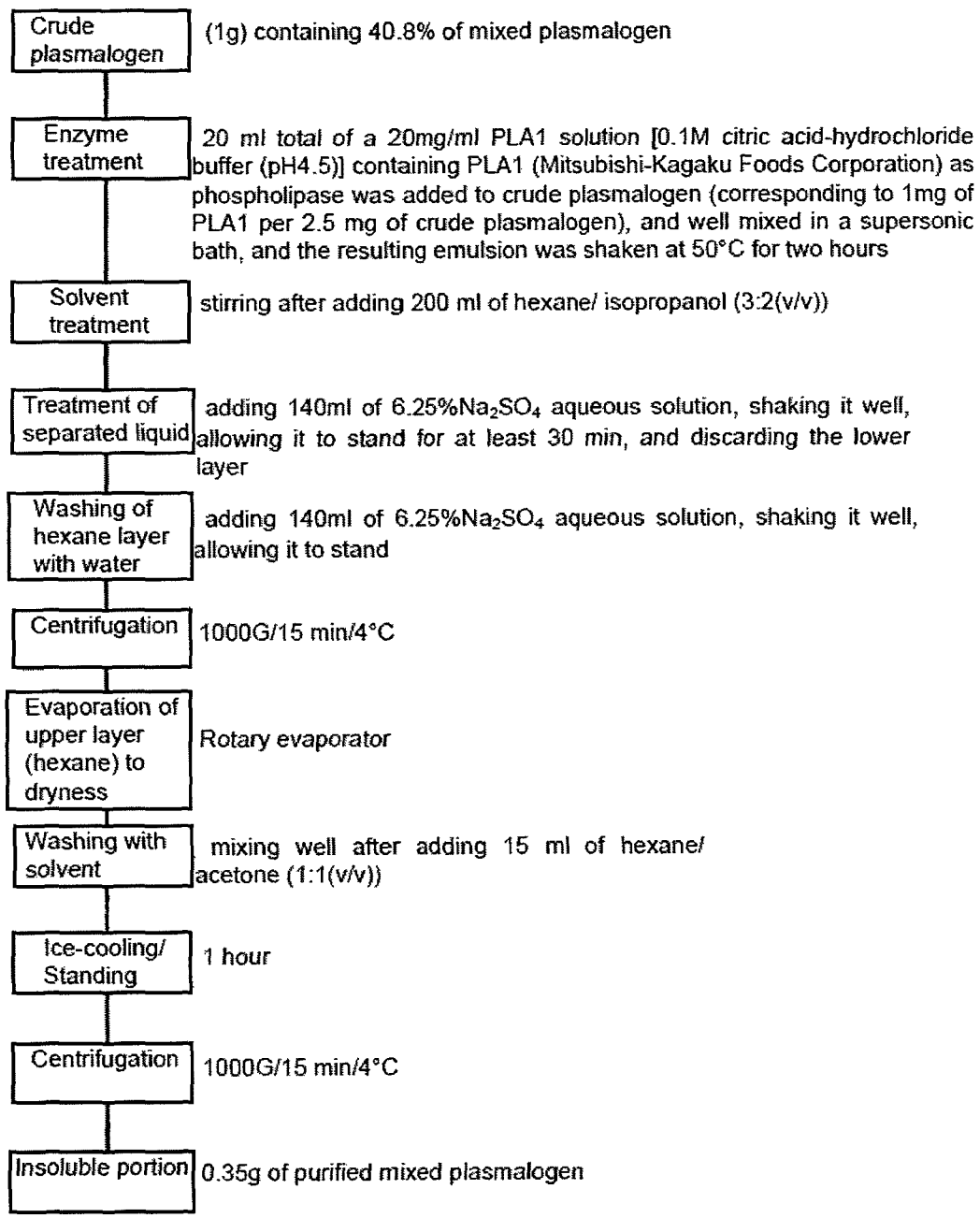
[FIG. 6]
A flow chart showing the processes of producing purified plasmalogen (mixture) from crude plasmalogen in an Example.

According to the same enzyme treatment and extraction as in FIG. 6, 0.5 g (yield=50%) of purified plPE was obtained from 1 g of crude product. A purity assay under the aforementioned conditions revealed that the purity was 95% (FIG. 3-4 of FIG. 3).

Example 2

Preparation of 100% plPE and 100% plPC Derived from Breast Meat of Culled Laying Hen (1) Mincing of Breast Meat of a Culled Laying Hen (Julia, 550-Days Old), and Extraction/Separation of Total Lipids from a Freeze-Dried Product Thereof.

Frozen minced chicken breast meat (supplied by Noji Kumiai Houjin, Enu Chicken (Chiran-cho gun 3669, Minami-kyushu shi, Kagoshima Prefecture) processed to 8 mm mince) obtained from the skinless breast meat of a culled laying hen was subjected to a usual freeze-drying process. The freeze-dried mince was subjected to total lipids extraction, as shown in FIG. 1-2. 3 g of total lipids was obtained at a yield of 3%.

Figure 5:
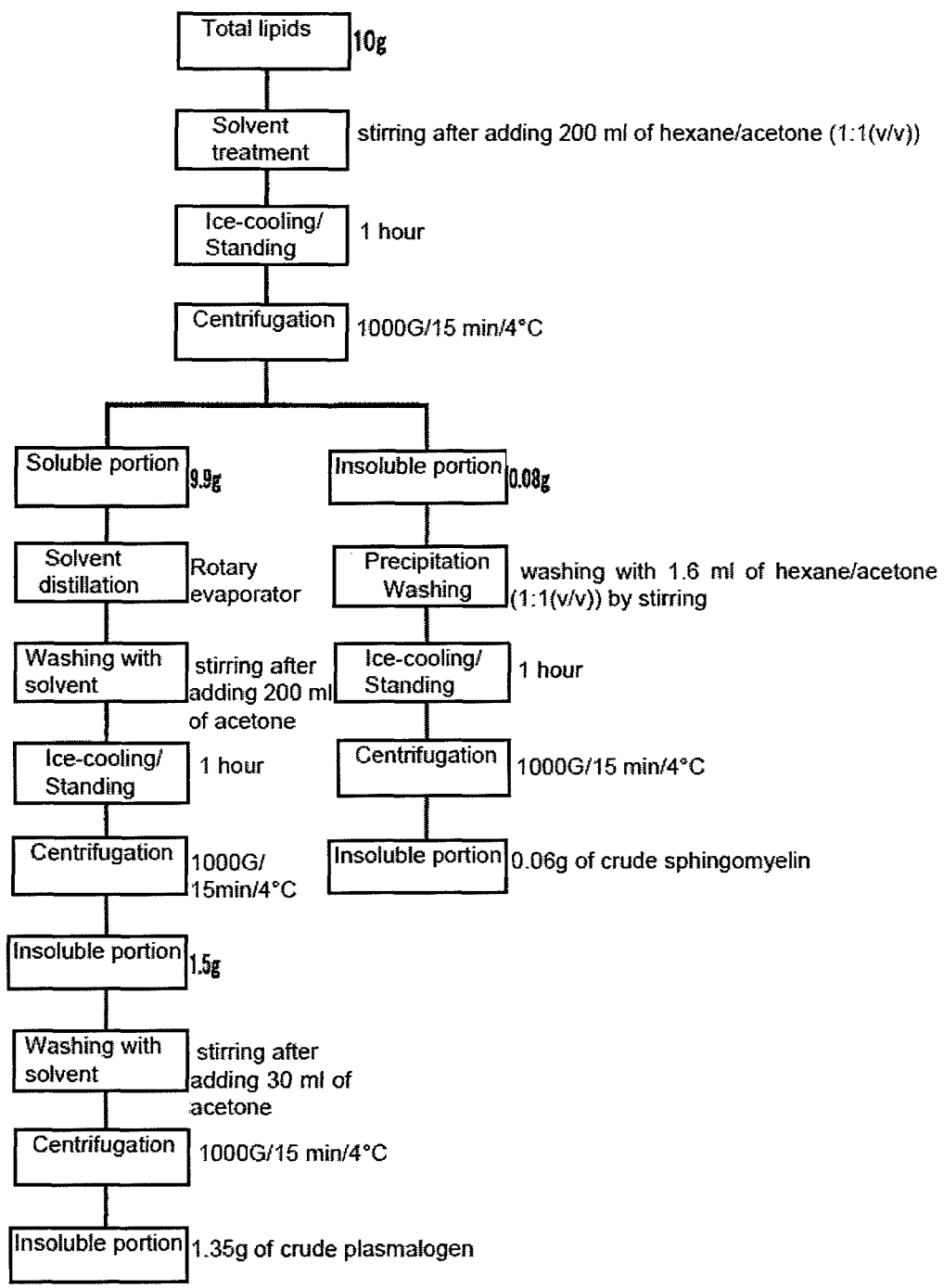
[FIG. 5]
A flow chart showing the processes of producing crude plasmalogen (mixture) and crude sphingomyelin from chicken breast meat total lipids in an Example.
Figure 7:
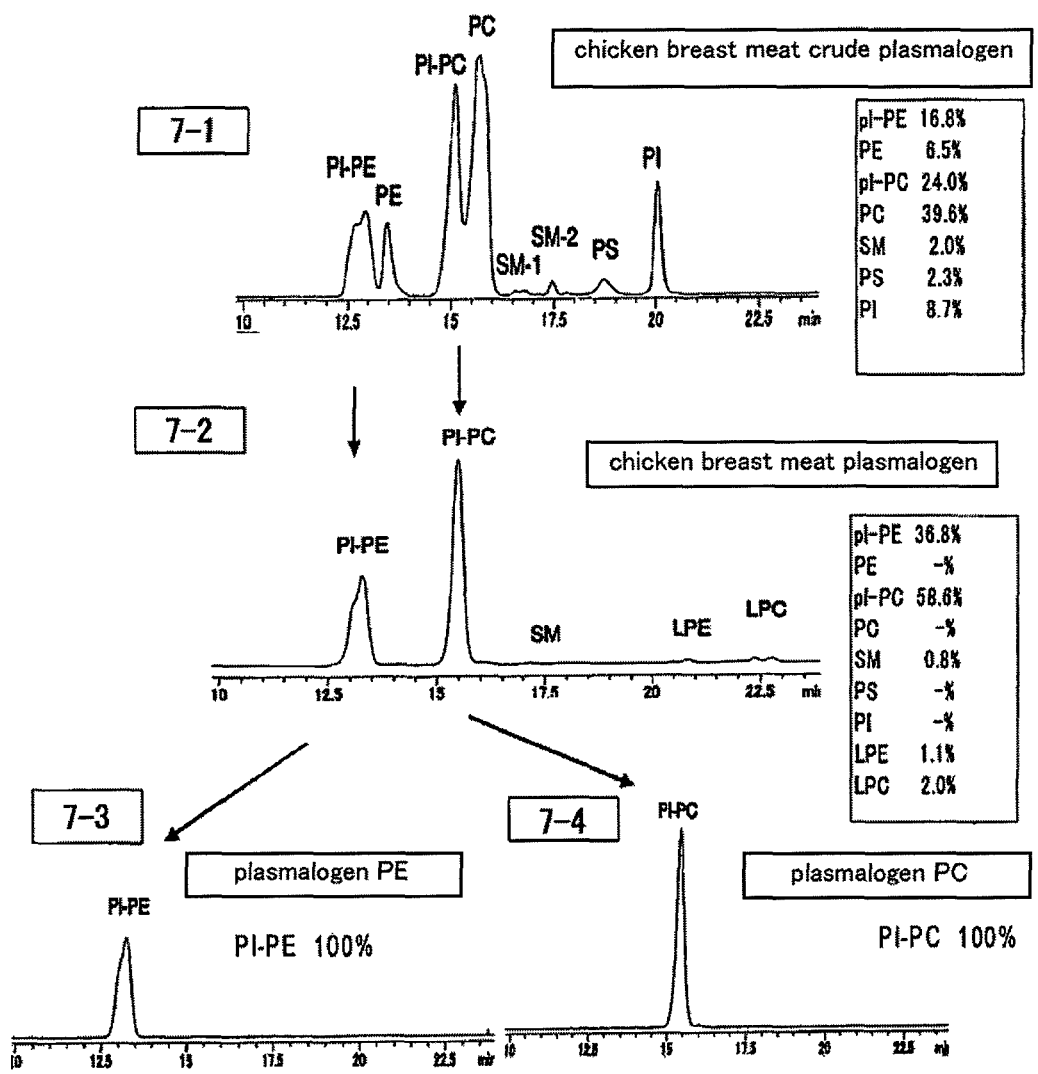
[FIG. 7]
An HPLC chart of chicken breast meat-derived phospholipids, according to an Example.

(2) Extraction of Crude [plPC+plPE] from Total Lipids Derived from Breast Meat of Culled Hen According to the method shown in FIG. 5, 1.35 g (yield=13.5%) of crude [plPC+plPE] was separated from 10 g of total lipids. The crude [plPC+plPE] was subjected to HPLC assay under the aforementioned conditions, resulting in a purity of 40.6% (FIG. 7-1 of FIG. 7).

(3) Purification of Crude [plPC+plPE] by Way of Enzyme Treatment and Extraction

According to the method shown in FIG. 6, 0.65 g (yield=65%) of purified [plPC+plPE] was obtained from 1 g of crude [plPC+plPE]. A purity assay under the aforementioned conditions revealed that the purity of the obtained [plPC+plPE] was 95.4% (FIG. 7-2 of FIG. 7).

Figure 8:
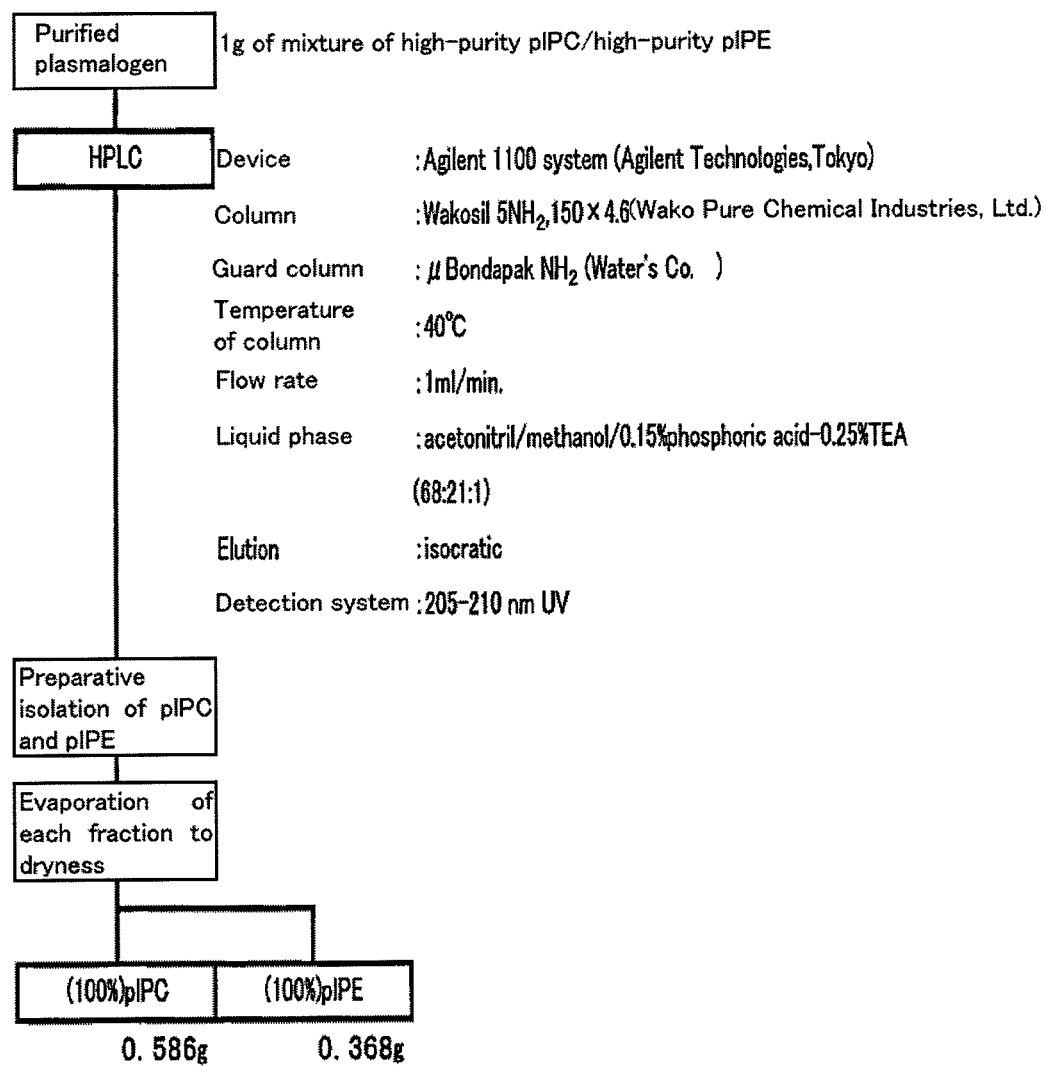
[FIG. 8]

(4) Separation of 100% plPC and 100% plPE from High-Purity [plPC+plPE], and Purification Thereof According to the method shown in FIG. 8, 1 g of high-purity [plPC+plPE] was subjected to HPLC for fractionation purification of plPC and plPE. As a result, 0.586 g of plPC fraction and 0.368 g of plPE fraction (total yield=95.4%) were obtained.

As shown in FIG. 7-3 and FIG. 7-4 of FIG. 7, an HPLC purity assay under the aforementioned conditions revealed that the purity was 100% for each fraction.

Example 3

Preparation of 100% SM, High-Purity [plPE+plPC], and 100% plPE and 100% plPC from Epidermis of a Male Broiler Breeding Hen (1) Extraction/Separation of Total Lipids from a Freeze-Dried Product of Deoiled Minced Skin Frozen minced chicken-skin (supplied by Noji Kumiai Houjin, Enu Chicken (Chiran-cho gun 3669, Minami-kyushu shi, Kagoshima Prefecture) processed to 8 mm mince) obtained from each green skin of five culled male breeding hens (Chunky, 450 days old, average mass=5.9 kg) was concentrated by deoiling, followed by a usual freeze-drying process. Each freeze-dried mince was subjected to total lipids extraction as shown in FIG. 1-1. The total lipids were obtained at an average yield of 5.5% (based on freeze-dried mass).

(2) Extraction of Crude SM from Total Lipids Derived from Culled Male Breeding Hen According to the method shown in FIG. 2-2 of FIG. 2, 0.85 g (yield=8.5%) of crude SM was obtained from 10 g of total lipids. An HPLC assay of the resulting crude SM under the aforementioned conditions revealed that the purity was 85%.

(3) Purification of Crude SM (Purity=85%) Derived from Culled Male Breeding Hen Skin Using Enzyme According to the method shown in FIG. 4, 0.74 g (yield=74%) of purified SM was obtained from 1 g of the crude product. A purity assay under the aforementioned conditions revealed that the purity was 100%.

(4) Extraction of Crude [plPE+plPC] from Total Lipids Derived from Culled Male Breeding Hen Skin According to the method shown in FIG. 2-1 of FIG. 2, 2.11 g (yield=21.1%) of crude [plPE+plPC] was obtained from 10 g of total lipids. An HPLC assay of the resulting crude [plPE+plPC] under the aforementioned conditions revealed that the purity was 40%.

(5) Purification of Crude [plPE+plPC] (Purity=40%) Derived from Culled Male Breeding Hen Skin Using Enzyme According to the same enzyme treatment and extraction as in FIG. 6, 0.35 g (yield=35%) of purified [plPE+plPC] was obtained from 1 g of the crude product. An HPLC purity assay under the aforementioned conditions revealed that the purity was 96%.

(6) Separation of 100% plPE and 100% plPC from high-purity [plPE+plPC] derived from culled male breeding hen skin, and purification thereof.

According to the method shown in FIG. 8, 1 g of high-purity [plPC+plPE] was subjected to HPLC for preparative purification of plPE and plPC. As a result, 0.71 g of plPE fraction, and 0.23 g of plPC fraction (total yield=94%) were obtained.

An HPLC assay under the aforementioned conditions revealed that the purity was 100% for each fraction.

Example 4

Preparation of High-Purity [plPCE+plPE], 100% plPC and 100% plPE from Breast Meat of Male Broiler Breeding Hen (1) Mincing of Breast Meat of Culled Male Breeding Hen and Extraction/Separation of Total Lipids from Freeze-Dried Product Thereof Frozen minced chicken breast meat (supplied by Noji Kumiai Houjin, Enu Chicken (Chiran-cho gun 3669, Minami-kyushu shi, Kagoshima Prefecture) processed to 8 mm mince) obtained from each skinless breast meat of five culled male breeding hens (Chunky, 450 days old, average mass=5.9 kg) was subjected to a usual freeze-drying process. Each freeze-dried mince was subjected to total lipids extraction as shown in FIG. 1-2. The total lipids were obtained at an average yield of 0.9% (based on raw minced breast meat).

(2) Extraction of Crude [plPC+plPE] from Total Lipids Derived from Breast Meat of Culled Male Breeding Hen According to the method shown in FIG. 5, 3.05 g (yield=30.5%) of crude [plPC+plPE] was obtained from 10 g of total lipids. An HPLC assay of the resulting crude [plPC+plPE] under the aforementioned conditions revealed that the purity was 39.9%.

(3) Purification of Crude [plPC+plPE] Derived from Breast Meat of Culled Male Breeding Hen by Way of Enzyme Treatment and Extraction According to the method shown in FIG. 6, 0.42 g (yield=42%) of purified [plPC+plPE] was obtained from 1 g of crude [plPC+plPE]. An HPLC purity assay under the aforementioned conditions revealed that the purity of [plPC+plPE] was 95%.

(4) Separation of 100% plPC and 100% plPE from High-Purity [plPC+plPE] Derived from Breast Meat of Culled Male Breeding Hen, and Purification Thereof According to the method shown in FIG. 8, HPLC was performed for preparative purification of plPC and plPE. As a result, 0.65 g of plPC fraction and 0.25 g of plPE fraction (total yield=90%) were obtained.

An HPLC purity assay under the aforementioned conditions revealed that the purity was 100% for each fraction.

Example 5

Preparation of 100% SM, High-Purity [plPE+plPC], 100% plPE and 100% plPC Derived from Epidermis of Culled Male Breeding Hen (1) Extraction/Separation of Total Lipids from Minced Culled Male Breeding Hen Epidermis Frozen minced chicken-skin (supplied by Noji Kumiai Houjin, Enu Chicken (Chiran-cho gun 3669, Minami-kyushu shi, Kagoshima Prefecture) processed to 8 mm mince) obtained from each green skin of five culled male breeding hens (Chunky, 450 days old, average mass=5.9 kg) was concentrated by deoiling, followed by a usual freeze-drying process. Each freeze-dried mince was subjected to total lipids extraction, as shown in FIG. 1-1. The total lipids were obtained at an average yield of 27%.

(2) Extraction of Crude SM from Total Lipids Derived from Culled Male Breeding Hen Skin According to the method shown in FIG. 2-2 of FIG. 2, 0.33 g (yield=3.3%) of a crude SM was obtained from 10 g of total lipids. An HPLC assay of the resulting SM under the aforementioned conditions revealed that the purity was 83%.

(3) Purification of Crude SM (Purity=83%) Derived from Culled Male Breeding Hen Skin Using Enzyme According to the method shown in FIG. 4, 0.75 g (yield=75%) of a purified SM was obtained from 1 g of a crude product. A purity assay under the aforementioned conditions revealed that the purity was 100%.

(4) Extraction of Crude [plPE+plPC] from Total Lipids Derived from Culled Male Breeding Hen Skin According to the method shown in FIG. 2-1 of FIG. 2, 0.24 g (yield=2.4%) of crude [plPE+plPC] was obtained from 10 g of total lipids. An HPLC assay of the resulting crude [plPE+plPC] under the aforementioned conditions revealed that the purity was 40%.

(5) Purification of Crude [plPE+plPC] (Purity=40%) Derived from Culled Male Breeding Hen Skin Using Enzyme According to the same enzyme treatment and extraction as in FIG. 6, 0.32 g (yield=32%) of purified [plPE+plPC] was obtained from 1 g of a crude product. A purity assay under the aforementioned conditions revealed that the purity was 95%.

(6) Separation of 100% plPE and 100% plPC from High-Purity [plPE+plPC] Derived from Culled Male Breeding Hen Skin, and Purification Thereof According to the method shown in FIG. 8, 1 g of high-purity [plPC+plPE] was subjected to HPLC for preparative purification of plPE and plPC. As a result, 0.81 g of plPE fraction and 0.14 g of plPC fraction (total yield=95%) were obtained.

An HPLC purity assay under the aforementioned conditions revealed that the purity was 100% for each fraction.

Example 6

Preparation of High-Purity [plPE+plPC], 100% plPE and 100% plPC from Breast Meat of Culled Male Breeding Hen (1) Extraction/Separation of Total Lipids from Minced Breast Meat of Culled Male Breeding Hen Frozen minced chicken breast meat (supplied by Noji Kumiai Houjin, Enu Chicken (Chiran-cho gun 3669, Minami-kyushu shi, Kagoshima Prefecture) processed to 8 mm mince) obtained from each skinless breast meat of five culled male breeding hens (Chunky, 450 days old, average mass=3.8 kg) was subjected to a usual freeze-drying process. The freeze-dried mince was subjected to total lipids extraction as shown in FIG. 1-2. The total lipids were obtained at an average yield of 2.35% (based on raw minced breast meat).

(2) Extraction of Crude [plPC+plPE] from Total Lipids Derived from Breast Meat of Culled Male Breeding Hen According to the method shown in FIG. 5, 5.2 g (yield=52%) of a crude [plPC+plPE] was obtained from 10 g of total lipids. An HPLC assay of the crude [plPC+plPE] under the aforementioned conditions revealed that the purity was 49%.

(3) Purification of Crude [plPC+plPE] Derived from Breast Meat of Culled Male Breeding Hen by Way of Enzyme Treatment and Extraction According to the method shown in FIG. 6, 0.42 g (yield=42%) of purified [plPC+plPE] was obtained from 1 g of crude [plPC+plPE]. An HPLC purity assay under the aforementioned conditions revealed that the purity of [plPC+plPE] was 95%.

(4) Separation of 100% plPC and 100% plPE from High-Purity [plPC+plPE] Derived from Breast Meat of Culled Male Breeding Hen, and Purification Thereof According to the method shown in FIG. 8, 1 g of high-purity [plPC+plPE] was subjected to HPLC for preparative purification of plPC and plPE. As a result, 0.65 g of plPC fraction and 0.25 g of plPE fraction (total yield=90%) were obtained.

An HPLC purity assay under the aforementioned conditions revealed that the purity was 100% for each fraction, as shown in FIG. 7-3 and FIG. 7-4 of FIG. 7.

Example 7

Preparation of SM and plPE Derived from Culled Laying Hen Skin (1) Extraction/Separation of Total Lipids from Deoiled Minced Chicken-Skin Frozen minced chicken-skin (supplied by Noji Kumiai Houjin, Enu Chicken (Chiran-cho gun 3669, Minami-kyushu shi, Kagoshima Prefecture) processed to 8 mm mince) obtained from the green skin of a culled laying hen (Julia, 738 days old, subjected to forced molting; hereinafter referred to as the "aforementioned" culled laying hen) was concentrated by deoiling, followed by total lipids extraction as shown in FIG. 1-1. The total lipids were obtained at a yield of 23.5%.

(2) Extraction of Crude SM from Total Lipids Derived from Culled Hen Skin 0.25 g (yield=2.5%) of a crude SM was obtained from 10 g of total lipids according to the method shown in FIG. 2-2 of FIG. 2. The crude SM was subjected to HPLC assay under the aforementioned conditions, resulting in a purity of 86.2%.

(3) Extraction of Crude [plPE+plPC] from Total Lipids Derived from Culled Chicken Skin According to the method shown in FIG. 2-1 of FIG. 2, 0.4 g of (yield=4.0%) crude [plPE+plPC] was separated from 10 g of total lipids. The crude [plPE+plPC] was subjected to HPLC assay under the aforementioned conditions, resulting in a purity of 38%.

(4) Purification of Crude SM (Purity=86.2%) Using Enzyme

According to the method shown in FIG. 4, 0.78 g (yield=78%) of a purified SM was obtained from 1 g of a crude product. A purity assay under the aforementioned conditions revealed that the purity was 96.9%.

(5) Purification of Crude [plPE+plPC] (Purity=38%) Using Enzyme

According to the same enzyme treatment and extraction as in FIG. 6, 0.55 g (yield=55%) of a purified plPE was obtained from 1 g of a crude product. A purity assay under the aforementioned conditions revealed that the purity was 96.2%.

Example 8

Preparation of 100% plPE and 100% plPC Derived from Breast Meat of Culled Laying Hen (1) Extraction/Separation of Total Lipids from Breast Meat of Culled Laying Hen Frozen minced chicken breast meat (supplied by Noji Kumiai Houjin, Enu Chicken (Chiran-cho gun 3669, Minami-kyushu shi, Kagoshima Prefecture) processed to 8 mm mince) obtained from the skinless breast meat of the aforementioned culled laying hen was subjected to total lipids extraction as shown in FIG. 1-2. 2.6 g of total lipids was obtained at a yield of 2.6%.

(2) Extraction of Crude [plPC+plPE] from Total Lipids Derived from Culled Hen Breast Meat According to the method shown in FIG. 5, 1.51 g of (yield=15.1%) crude [plPC+plPE] was separated from 10 g of total lipids. The crude [plPC+plPE] was subjected to HPLC assay under the aforementioned conditions, resulting in a purity of 41.2%.

(3) Purification of Crude [plPC+plPE] by Way of Enzyme Treatment and Extraction

According to the method shown in FIG. 6, 0.75 g (yield=75%) of purified [plPC+plPE] was obtained from 1 g of crude [plPC+plPE]. An HPLC purity assay under the aforementioned conditions revealed that the purity of [plPC+plPE] was 96.2%.

(4) Separation of 100% plPC and 100% plPE from High-Purity [plPE+plPC], and Purification Thereof According to the method shown in FIG. 8, 1 g of high-purity [plPC+plPE] was subjected to HPLC for preparative purification of plPC and plPE. As a result, 0.59 g of plPC fraction and 0.37 g of plPE fraction (total yield=96.0%) were obtained.

An HPLC purity assay under the aforementioned conditions revealed that the purity was 100% for each fraction.

In a comparison between Example 1 and Example 7 with respect to SM and plPE derived from culled laying hen skin, in Example 1 using a general culled laying hen, the yield and purity of the purified plPE were 50% and 95%, respectively, while the yield and purity of the purified SM were 75% and 96.2%, respectively. In contrast, in Example 7 using a culled laying hen subjected to forced molting, the yield and purity of the purified plPE were 55% and 96.2%, respectively, while the yield and purity of the purified SM were 78% and 96.9%, respectively. Further, in a comparison between Example 2 and Example 8 with respect to [plPC+plPE] derived from breast meat of culled laying hen, in Example 2 using a general culled laying hen, the total yield and each purity of the purified [plPC+plPE] were 95.4% and 100%, respectively. In contrast, in Example 8 using a culled laying hen subjected to forced molting, the total yield and each purity of the purified [plPC+plPE] were 96.0% and 100%, respectively. As is evident from these results, the culled laying hen subjected to forced molting had higher yields and purities for both the purified plPE and SM, and higher total yield of the purified [plPC+plPE] than that of a general culled laying hen.

Industrial Applicability

The process for producing high-purity phospholipid of the present invention enables production of high-purity sphingomyelin, in particular, a human sphingomyelin, and high-purity plasmalogen-form glycerophospholipid, which are useful as materials of functional foods, medicinal products, cosmetics etc., from a biological material, such as poultry, by simple procedures at high yields.

The invention claimed is:

1. A process for producing sphingomyelin and plasmalogen-form glycerophospholipid comprising the steps of:
   (A) extracting dried total lipids obtained from poultry with an extraction solution comprising a mixture of an aliphatic hydrocarbon solvent and a water-soluble ketone solvent to separate an insoluble portion composed mainly of sphingomyelin and a soluble portion;
   (B) contacting the separated insoluble portion composed mainly of sphingomyelin obtained in step (A) with a solution comprising an aliphatic hydrocarbon solvent and a water-soluble ketone solvent to obtain crude sphingomyelin;

(C) removing solvent from the soluble portion obtained in step (A), then contacting the soluble portion with a water-soluble ketone solvent to obtain a crude plasmalogen-form glycerophospholipid;

(D) contacting the crude sphingomyelin obtained in step (B) with a glycerophospholipid hydrolase to hydrolyze a glycerophospholipid group contained in the crude sphingomyelin and performing solvent partitioning to obtain sphingomyelin having purity of 90% or more; and (E) contacting the crude plasmalogen-form glycerophospholipid obtained in step (C) with a glycerophopholipid hydrolase to hydrolyze other glycerophospholipid groups contained in the crude plasmalogen-form glycerophospholipid and performing solvent partitioning to obtain a plasmalogen-form glycerophospholipid having a purity of 40% or more.

2. The process according to claim 1, wherein the poultry is a culled laying hen and/or a culled breeding hen.

3. The process according to claim 2, wherein the culled laying hen is obtained from a forced-molted laying hen.

4. The process according to claim 1, wherein the aliphatic hydrocarbon solvent in steps (A) and (B) is n-hexane.

5. The process according to claim 1, wherein the water-soluble ketone solvent in steps (A), (B) and (C) is acetone.

* * * * *